United States Patent
Ananthapadmanabh et al.

(10) Patent No.: US 11,381,496 B1
(45) Date of Patent: Jul. 5, 2022

(54) TESTING A TWO-PHASE COMMIT PROTOCOL CONFORMANCE OF A CLOUD BASED ONLINE TRANSACTION PROCESSING PLATFORM

(71) Applicant: International Business Machines Corporation, Armonk, NY (US)

(72) Inventors: Madhu B Ananthapadmanabh, Bangalore (IN); Kishor Kulkarni, Gadag (IN); Reshmi George, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/327,997

(22) Filed: May 24, 2021

(51) Int. Cl.
*H04L 43/50* (2022.01)
*H04L 43/04* (2022.01)

(52) U.S. Cl.
CPC ............. *H04L 43/50* (2013.01); *H04L 43/04* (2013.01)

(58) Field of Classification Search
CPC ................................. H04L 43/50; H04L 43/04
See application file for complete search history.

(56) References Cited

U.S. PATENT DOCUMENTS

| | | | | |
|---|---|---|---|---|
| 6,243,862 B1 * | 6/2001 | Lebow | ................. | G06F 9/466 702/119 |
| 8,874,400 B2 * | 10/2014 | Manfredi | ............ | G06F 11/3672 702/108 |
| 9,354,998 B2 * | 5/2016 | Hyland | ................ | G06F 11/3688 |
| 2002/0156664 A1 * | 10/2002 | Willcox | ........... | G06Q 10/06315 705/7.13 |
| 2006/0190480 A1 * | 8/2006 | Ori | ........................ | G06Q 10/10 |
| 2006/0282478 A1 * | 12/2006 | Purtell | ................ | G06F 16/1865 |
| 2007/0291650 A1 * | 12/2007 | Ormazabal | ......... | H04L 63/1416 370/244 |
| 2015/0120853 A1 * | 4/2015 | Nguyen | .................. | H04L 51/26 709/207 |

(Continued)

OTHER PUBLICATIONS

Anonymous, "Buyer Beware: ACID Compliance of Analytical Data Platforms May Not Be What You Expect." Splice Machine. Jun. 19, 2019. 5 Pages.

(Continued)

*Primary Examiner* — Philip C Lee
(74) *Attorney, Agent, or Firm* — Cantor Colburn LLP; Teddi Maranzano (57) ABSTRACT

Embodiments include methods, systems and computer program products for performing a two-phase commit conformance test for a cloud based online transaction processing system (OLTP). Aspects include receiving, by a test case manager of the OLTP from a transaction manager of the OLTP, a transaction event including metadata regarding a transaction and determining a state of the transaction. Aspects also include identifying a test case based on the metadata and the state of the transaction and issuing state events to the transaction manager, wherein the state events are determined based on the test case. Aspects further include obtaining log information from the transaction manager and determining compliance by the transaction manager with the two-phase commit conformance test based at least in part on the log information.

18 Claims, 7 Drawing Sheets

(56) References Cited

U.S. PATENT DOCUMENTS

2020/0310860 A1* 10/2020 Arumugam ............. G06F 9/542

OTHER PUBLICATIONS

Anonymous, "Operational (OLTP) DBMS with Full ACID-Transaction Support" https://www.faircom.com/products/faircom-db/acid-transactions. 5 Pages.
Bacon et al. "Spanner: Becoming a SQL System," May 14-19, 2017, DOI: http://dx.doi.org. 13 Pages.
Carbone, "Open Banking Conformance Testing." Pingidentity, Sep. 26, 2018. 5 Pages.
Gupta et al., "A Non-blocking Two-phase Commit Protocol" International Conference on Extending Database Technology (EDBT), Mar. 26-29, 218. 12 Pages.
Prakash, "Performance Testing of Event-Driven Microservices." Medium.com, Feb. 2017. 9 Pages.

* cited by examiner

TESTING A TWO-PHASE COMMIT PROTOCOL CONFORMANCE OF A CLOUD BASED ONLINE TRANSACTION PROCESSING PLATFORM

BACKGROUND

The present invention relates to testing of an online transaction processing (OLTP) platform, and more specifically, to testing a two-phase commit protocol conformance of a cloud based OLTP platform.

The two-phase commit protocol conformance test is a commonly performed test for an OLTP platform. For a traditional, i.e., non-cloud based, OLTP platforms, a two-phase commit conformance test is performed by pausing the state of the two-phase commit protocol for a predefined period with a log message indicating the pause. During this window of pause, error scenario test cases are performed.

Traditional two-phase commit testing is configured to test one state at a time and is designed to work with a single OLTP. The OLTP platform will pause at a predefined at a predefined state indicating the state and the pause through a log message. Test cases are run manually during the pause window. Traditional two-phase commit testing cannot be adapted to a cloud-based OLTP platform as cloud-based OLTP platforms introduce complexities related to unpredictable scheduling, scaling, workload management and failure patterns of the cloud.

SUMMARY

According to an aspect of the present invention there is provided a computer-implemented method for testing a two-phase commit protocol conformance of a cloud based OLTP platform. The method includes receiving, by a test case manager of the OLTP from a transaction manager of the OLTP, a transaction event including metadata regarding a transaction and determining, by the test case manager, a state of the transaction. The method also includes identifying, by the test case manager, a test case based on the metadata and the state of the transaction and issuing, by a test controller of the test case, state events to the transaction manager, wherein the state events are determined based on the test case. The method also includes obtaining, by a log analyzer of the test case manager, log information from the transaction manager and determining, by the test case manager, compliance by the transaction manager with the two-phase commit conformance test based at least in part on the log information.

According to another aspect of the present invention there is provided a system for testing a two-phase commit protocol conformance of a cloud based OLTP platform. The system includes a processor and a memory configured to provide computer program instructions to the processor to receive, by a test case manager of the OLTP from a transaction manager of the OLTP, a transaction event including metadata regarding a transaction and determine, by the test case manager, a state of the transaction. The instructions also cause the processor to identify, by the test case manager, a test case based on the metadata and the state of the transaction and issuing, by a test controller of the test case, state events to the transaction manager, wherein the state events are determined based on the test case. The instructions further cause the processor to obtain, by a log analyzer of the test case manager, log information from the transaction manager and determine, by the test case manager, compliance by the transaction manager with the two-phase commit conformance test based at least in part on the log information.

According to a further aspect of the present invention there is provided a computer program product for testing a two-phase commit protocol conformance of a cloud based OLTP platform, the computer program product comprising a computer readable storage medium having program instructions embodied therewith. The program instructions executable by a processor to cause the processor to receive, by a test case manager of the OLTP from a transaction manager of the OLTP, a transaction event including metadata regarding a transaction and determine, by the test case manager, a state of the transaction. The instructions also cause the processor to identify, by the test case manager, a test case based on the metadata and the state of the transaction and issuing, by a test controller of the test case, state events to the transaction manager, wherein the state events are determined based on the test case. The instructions further cause the processor to obtain, by a log analyzer of the test case manager, log information from the transaction manager and determine, by the test case manager, compliance by the transaction manager with the two-phase commit conformance test based at least in part on the log information.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings. Embodiments of the present invention will now be described, by way of example only, with reference to the following drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Embodiments include methods, systems, and computer program products for testing a two-phase commit protocol conformance of a cloud based online transaction processing (OLTP) platform. In exemplary embodiments, the cloud environment brings in a lot of unpredictability such as initialization of a transaction manager on different nodes in a cluster, extended resync times with the participants, etc. Embodiments include an event-driven test framework that will enable automated and realistic two-phase commit protocol conformance test for a cloud-based OLTP platform. In one embodiment, the framework is built on a publish/subscribe based messaging platform that is used to transmit messages between a test controller and the test case manager components that are responsible for all the event coordination and the test case execution.

Figure 1:
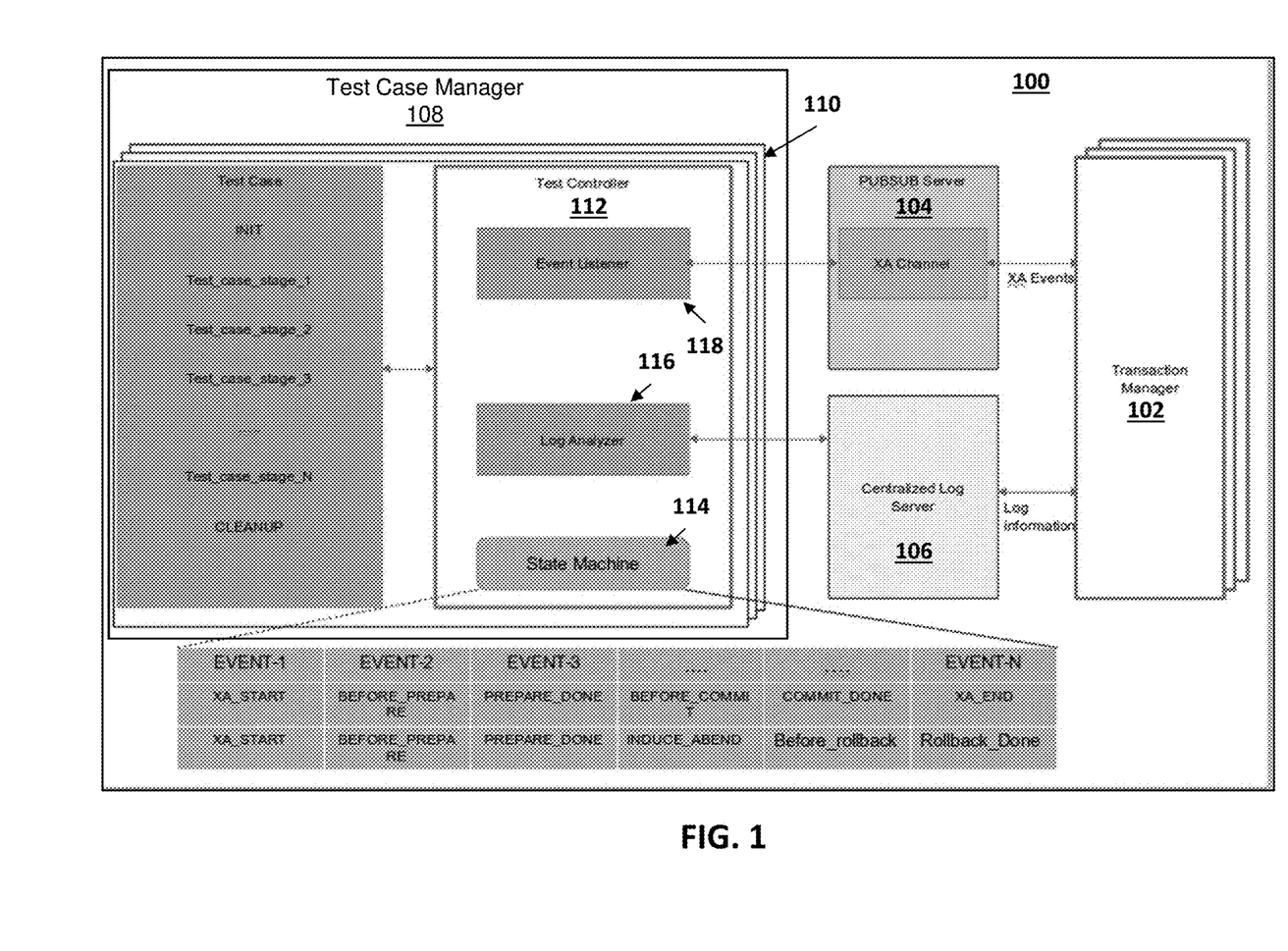
FIG. 1 is a block diagram of an example embodiment of a system in accordance with the present invention.

Referring to FIG. 1, a block diagram shows an example embodiment of a system 100 for testing a two-phase commit protocol conformance of a cloud based online transaction processing (OLTP) platform. The system 100 includes one or more transaction managers 102, a publish/subscribe server 104, a test case manager 108, and a centralized log server 106. In exemplary embodiments, the transaction managers 102 of the cloud-based OLTP platform are configured to emit two-phase commit protocol state events for randomly selected transactions. These state events are configured to initiate a test of the two-phase commit protocol. The randomness of the generation of these events enables testing of the two-phase commit conformance in a more realistic scenario. In exemplary embodiments, the frequency that the transaction managers 102 are configured to emit the state events is configurable by an administrator of the transaction managers.

The transaction manager 102, the publish/subscribe server 104 and the test case manager 108 may each include at least one processor, a hardware module, or a circuit for executing the functions of the described components which may be software units executing on the at least one processor. Multiple processors running parallel processing threads may be provided enabling parallel processing of some or all of the functions of the components. Memory may be configured to provide computer instructions to the at least one processor to carry out the functionality of the components.

The transaction managers 102 are the part of the OLTP platform that are being tested by the two-phase commit protocol conformance test. The transaction managers 102 are responsible for managing global transactions across different resource managers and other downstream transaction participants that are not shown in FIG. 1. The publish/subscribe server 104 facilitates the transmission of state events on a set of channels created by the transaction manager 102. In one embodiment, the transaction manager 102 publishes messages on a channel referred to as an XA channel with a global transaction id (GTID) as a message. The publish/subscribe server 104 then creates a channel with the GTID value and further messages regarding this transaction will happens over this XA channel. The centralized log server 106 is configured to store and manage logs from the transaction managers 102 logs. The centralized log server 106 are used by a log analyzer 116 of the test case 110 for automated log analyses.

The test case manager 108 configured to trigger the execution of a test case 110 for a transaction. The test case manager 108 is also responsible for managing, synchronizing and parallelizing the test cases 110. Each test case 110 is designed to test the operation of the transaction manager 102 for a specific type of transaction. Each test case 110 includes a test controller 112 which has an event listener 118 that is configured to listen for the state events written on a specific GTID channel by the transaction manager 102. Each test cases 110 is configured to identify specific state events and to take a pre-defined action in response to the specific state event. The test controller 112 also includes a log analyzer 116 that connects to a centralized log server 106 to get the specific log information at a specific time for the appropriate transaction manager 102. The log information is used by the test controller 112 to verify the behavior of the transaction manager 102 conforms to the desired behavior based on the test case. The test controller 112 also includes a state machine 114 that maintains a sequence of events that every test case 110 will follow. Based on the state machine 114 the test case 110 checks the event listener 118 and log analyzer 116 and decides on the state of the test case.

In exemplary embodiments, the test case manager 108 subscribes to the XA channel and upon receiving a message, such as an XA start event message, with a new GTID, a test on an event will be triggered. The test case manager 108 will select a test case 110 based on data extracted from the message and will subscribe the test case 110 to the specific GTID channel associated with the message. The GTID channel will be used to communicate the XA events between the test case 110 and the transaction manager 102.

Figure 2:
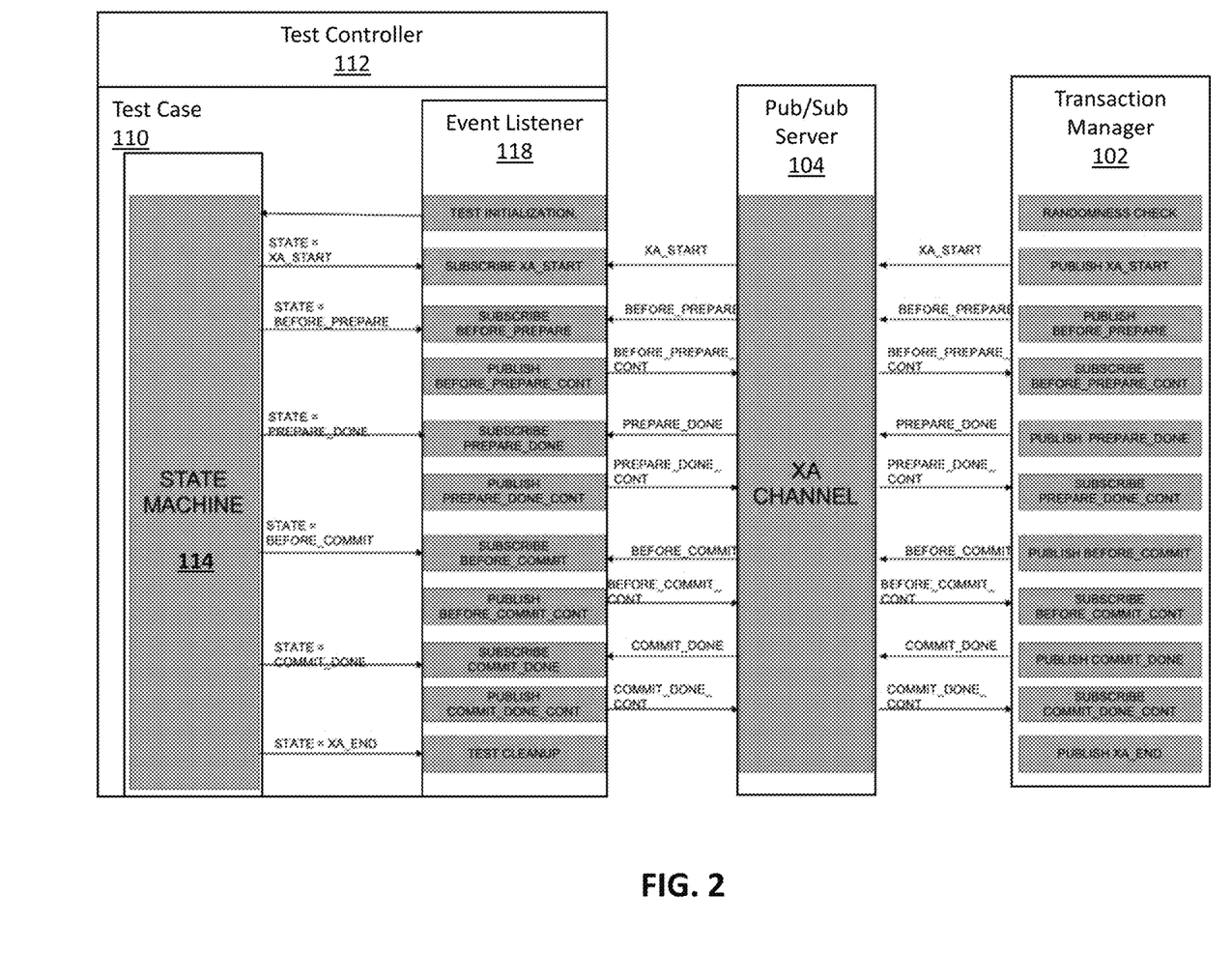
FIG. 2 is a schematic diagram of an example embodiment of the operation of a system in accordance with the present invention.

Referring to FIG. 2, a schematic diagram shows the operation of the system of FIG. 1 in accordance with the present invention. As illustrated, the transaction manager 102 exchanges state events, such as the XA_START event to the publish/subscribe server 104, which in turn, exchanges state events with the event listener 118 of the test controller 112. The event listener 118 exchanges state events with the state machine 114. The state machine 114 is configured to track the state of the transaction and maintains a sequence of events that the test case will follow.

The transaction manager 102 is configured to transmit the following state events: a XA_START, which is the state event notifying the publish/subscribe server 104 and the test case manager 108 of the start of a new transaction; a BEFORE_PREPARE state event which is the event notifying ready to start transaction prepare; a PREPARE_DONE state event which is the event notifying transaction prepare done; a BEFORE_COMMIT state event which is the event notifying ready to start transaction commit; a COMMIT_DONE state event which is the event notifying transaction commit done; a BEFORE_ROLLBACK state event which is the event notifying, ready to start transaction rollback; a AFTER_ROLLBACK state event which is the event notifying transaction rollback done; and a XA_END state event which is the event notifying the end of the transaction.

The test case 110 is configured to transmit the following state events for a given global transaction ID: a BEFORE_PREPARE_CONT state event which is the event notifying transaction manager to continue the transaction prepare operation; a PREPARE_DONE_CONT state event which is the event notifying transaction manager to continue into the next phase of transaction operation; a BEFORE_COMMIT_CONT state event which is the event notifying transaction manager to continue the transaction commit operation; a COMMIT_DONE_CONT state event which is the event notifying transaction manager to continue into the next phase of transaction operation; a BEFORE_ROLLBACK_CONT state event which is the event notifying transaction manager to continue the transaction rollback operation; and a ROLLBACK_DONE_CONT state event which is the event notifying transaction manager to continue into the next phase of transaction operation.

In one embodiment, the transaction manager (TM) 102 and the test case (TC) 110 exchange the following set of state events during a transaction prepare and commit success scenario: TM, PUBLISH XA_START; TM, PUBLISH BEFORE_PREPARE; TM, SUBSCRIBE BEFORE_PRE- PARE_CONT; TC, PUBLISH BEFORE_PREPARE_CONT; TM, PUBLISH PREPARE_DONE; TM, SUBSCRIBE PREPARE_DONE_CONT; TC, PUBLISH PREPARE_DONE_CONT; TM, PUBLISH BEFORE_COMMIT; TM, SUBSCRIBE BEFORE_COMMIT_CONT; TC, PUBLISH BEFORE_COMMIT_CONT; TM, PUBLISH COMMIT_DONE; TM, SUBSCRIBE COMMIT_DONE_CONT; TC, PUBLISH COMMIT_DONE_CONT; and TM PUBLISH XA_END.

Figure 3:
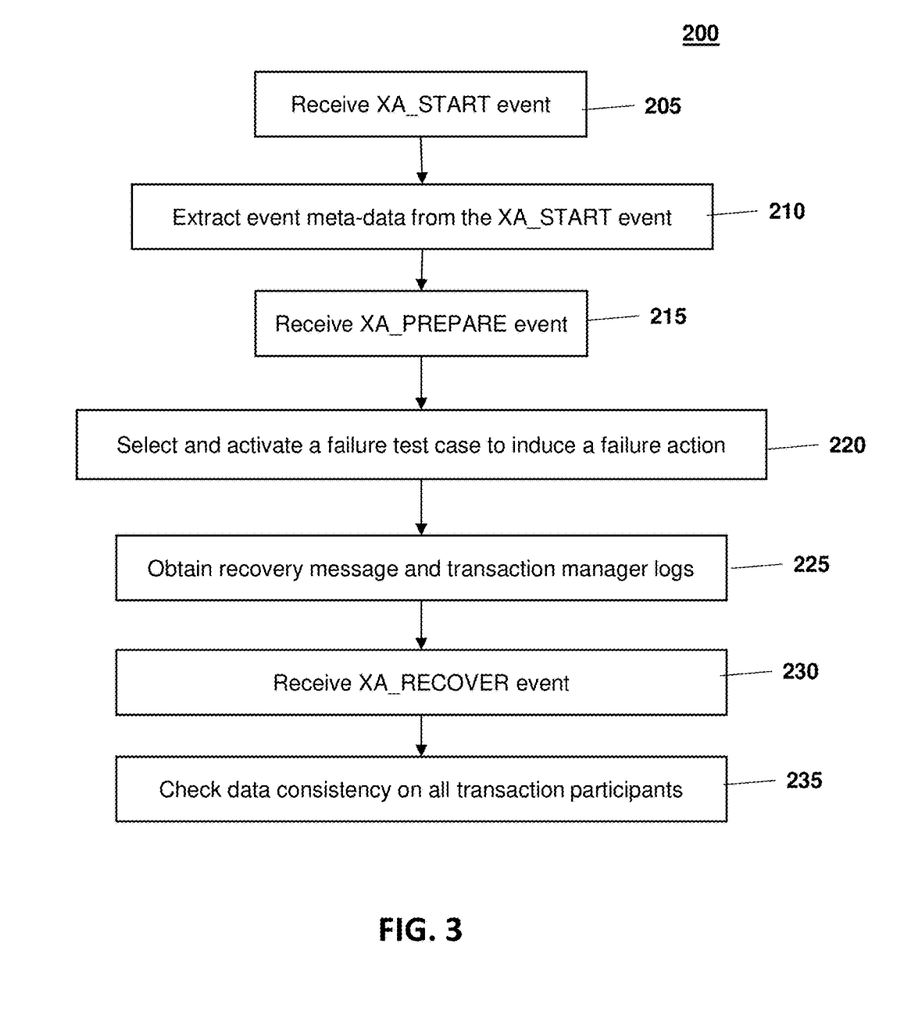
FIG. 3 is flow diagram of an example embodiment of a method in accordance with the present invention.

Referring now to FIG. 3, a flow diagram of a method 200 for performing a two-phase commit conformance test for a cloud based online transaction processing system (OLTP), in accordance with the present invention is shown. The method 200 includes receiving an XA_START event, as shown at block 205. Next, as shown at block 210, the method 200 includes extracting event metadata from the XA_START event. In exemplary embodiments, the XA_START event will have the following metadata:

```
participant{
    String name;
    enum type {
        DB2,IBM-MQ,CICSTS
    };
    enum state {
        PREPARE,COMMIT,ROLLBACK
    };
    Configuration configuration_data;
}
metadata{
    String XID;
    int numberOfParticipants;
    participant participantList[ ];
}
```

The method 200 also include receiving an XA_PREPARE event, as shown at block 215. Next, as shown at block 220, the method 200 includes selecting an activating a failure test case to induce a failure action. In one embodiment, the failure action can include bringing down a database, or transaction participant. In other embodiments, the failure actions can include simulating a network failure or an abnormal termination of a transaction. The method 200 also includes obtaining recovery message and transaction manager logs, as shown at block 225. Next, as shown at block 230, the method 200 also includes receiving an XA_RECOVER event. The method 200 concludes at block 235 by checking data consistency on all transaction participants.

Figure 4:
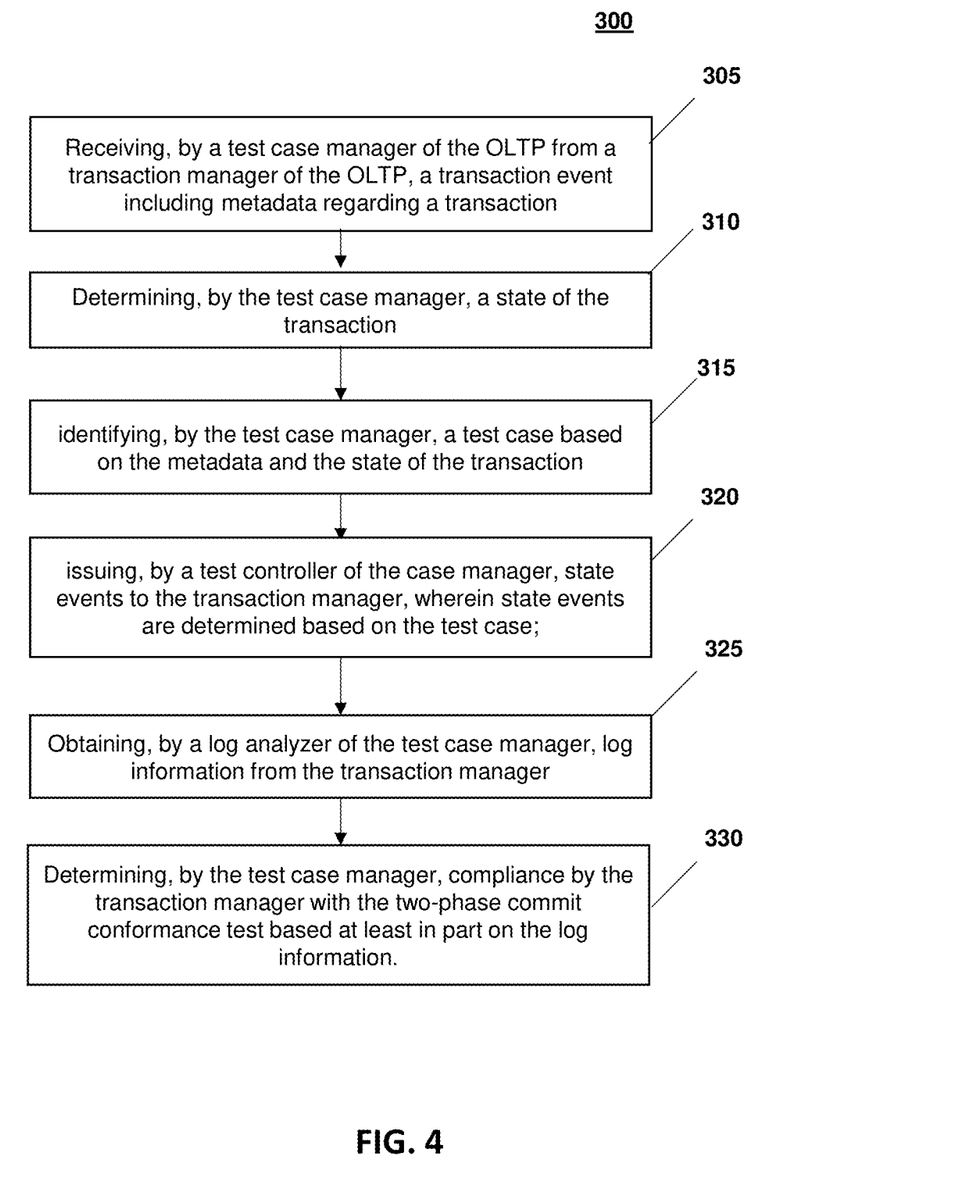
FIG. 4 is flow diagram of an example embodiment of another method in accordance with the present invention.

Referring now to FIG. 4, flow diagram of an example embodiment of a method 300 for performing a two-phase commit conformance test for a cloud based online transaction processing system (OLTP), in accordance with the present invention is shown.

As shown at block 305, the method 300 includes receiving, by a test case manager of the OLTP from a transaction manager of the OLTP. In exemplary embodiments, the test case manager receives the transaction event from the transaction manager via a publish/subscribe server. The transaction event includes metadata regarding a transaction and the metadata includes data that indicates a type of the resource manager, such as (DB2, MQ, etc.) and a type of the transaction, such as a prepare transaction, a commit transaction, or a rollback transaction. The metadata may also include a number of participants in the transaction and an identification of the participants. In exemplary embodiments, the transaction manager is configured to create the transaction events in a random manner that is configurable by a user. Next, as shown at block 310, the method 300 includes determining, by the test case manager, a state of the transaction. The method 300 further includes identifying, by the test case manager, a test case based on the metadata and the state of the transaction, as shown at block 315.

Next, as shown at block 320, the method 300 includes issuing, by a test controller of the test case, state events to the transaction manager. The state events are determined based on the test case and are transaction events that are configured to prompt a desired response by the transaction manager. The method 300 also includes obtaining, by a log analyzer of the test case manager, log information from the transaction manager, as shown at block 325. The method 300 concludes at block 330 by determining, by the test case manager, compliance by the transaction manager with the two-phase commit conformance test based at least in part on the log information. In exemplary embodiments, determining compliance by the transaction manager with the two-phase commit conformance test includes determining, based on the log information from the transaction manager, whether the transaction manager performed the desired response.

Figure 5:
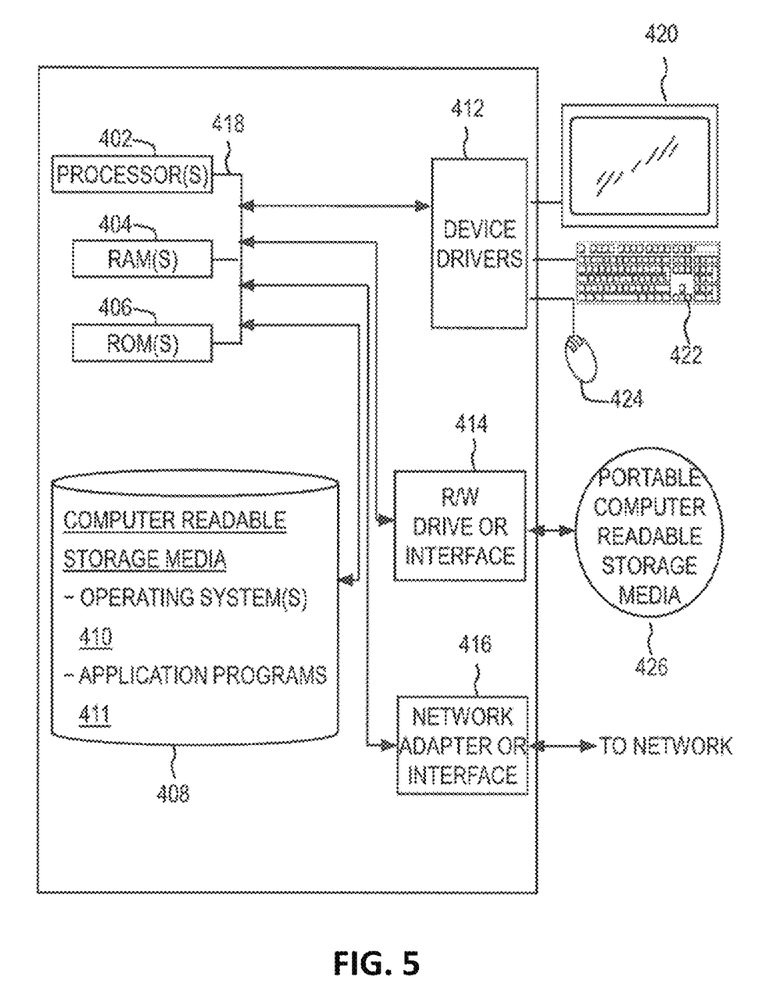
FIG. 5 is a block diagram of an embodiment of a computer system in which the present invention may be implemented.

FIG. 5 depicts a block diagram of components of a computing device that may be utilized as one or more of the components of the system 100 of FIG. 1, such as the transaction manager 102, the publish/subscribe server 104 and the test case manager 108 in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computing device can include one or more processors 402, one or more computer-readable RAMs 404, one or more computer-readable ROMs 406, one or more computer readable storage media 408, device drivers 412, read/write drive or interface 414, and network adapter or interface 416, all interconnected over a communications fabric 418. Communications fabric 418 can be implemented with any architecture designed for passing data and/or control information between processors (such as microprocessors, communications and network processors, etc.), system memory, peripheral devices, and any other hardware components within the system.

One or more operating systems 410, and application programs 411, such as the test cases 110 are stored on one or more of the computer readable storage media 408 for execution by one or more of the processors 402 via one or more of the respective RAMs 404 (which typically include cache memory). In the illustrated embodiment, each of the computer readable storage media 408 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device can also include a R/W drive or interface 414 to read from and write to one or more portable computer readable storage media 426. Application programs 411 on computing device can be stored on one or more of the portable computer readable storage media 426, read via the respective R/W drive or interface 414 and loaded into the respective computer readable storage media 408.

Computing device can also include a network adapter or interface 416, such as a TCP/IP adapter card or wireless communication adapter. Application programs 411 on computing device can be downloaded to the computing device from an external computer or external storage device via a network (for example, the Internet, a local area network or other wide area networks or wireless networks) and network adapter or interface 416. From the network adapter or interface 416, the programs may be loaded into the computer readable storage media 408. The network may comprise copper wires, optical fibers, wireless transmission, routers, firewalls, switches, gateway computers and edge servers.

Computing device can also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414, and network adapter or interface 416 can comprise hardware and software stored in computer readable storage media 408 and/or ROM 406.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
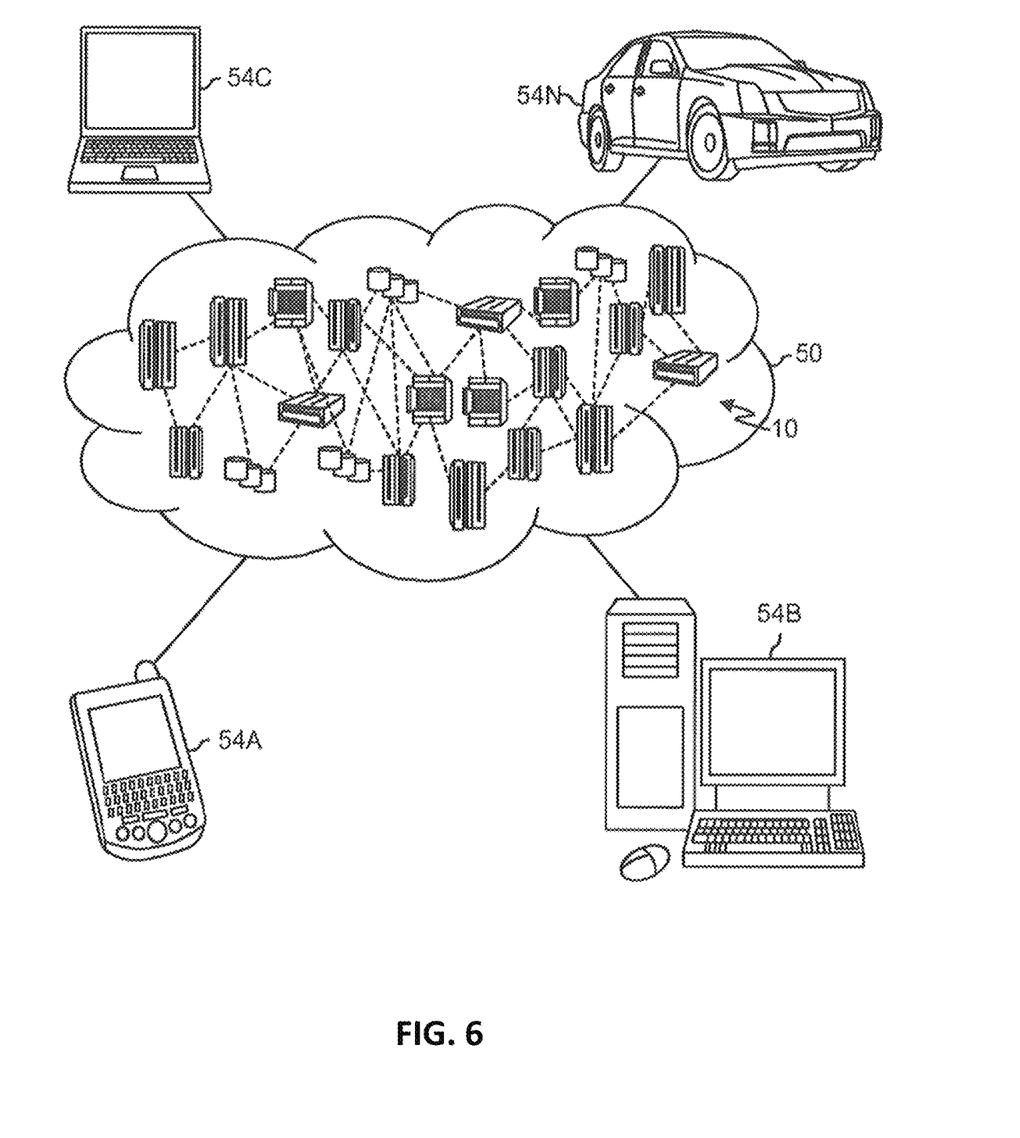
FIG. 6 is a schematic diagram of a cloud computing environment in which the present invention may be implemented.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
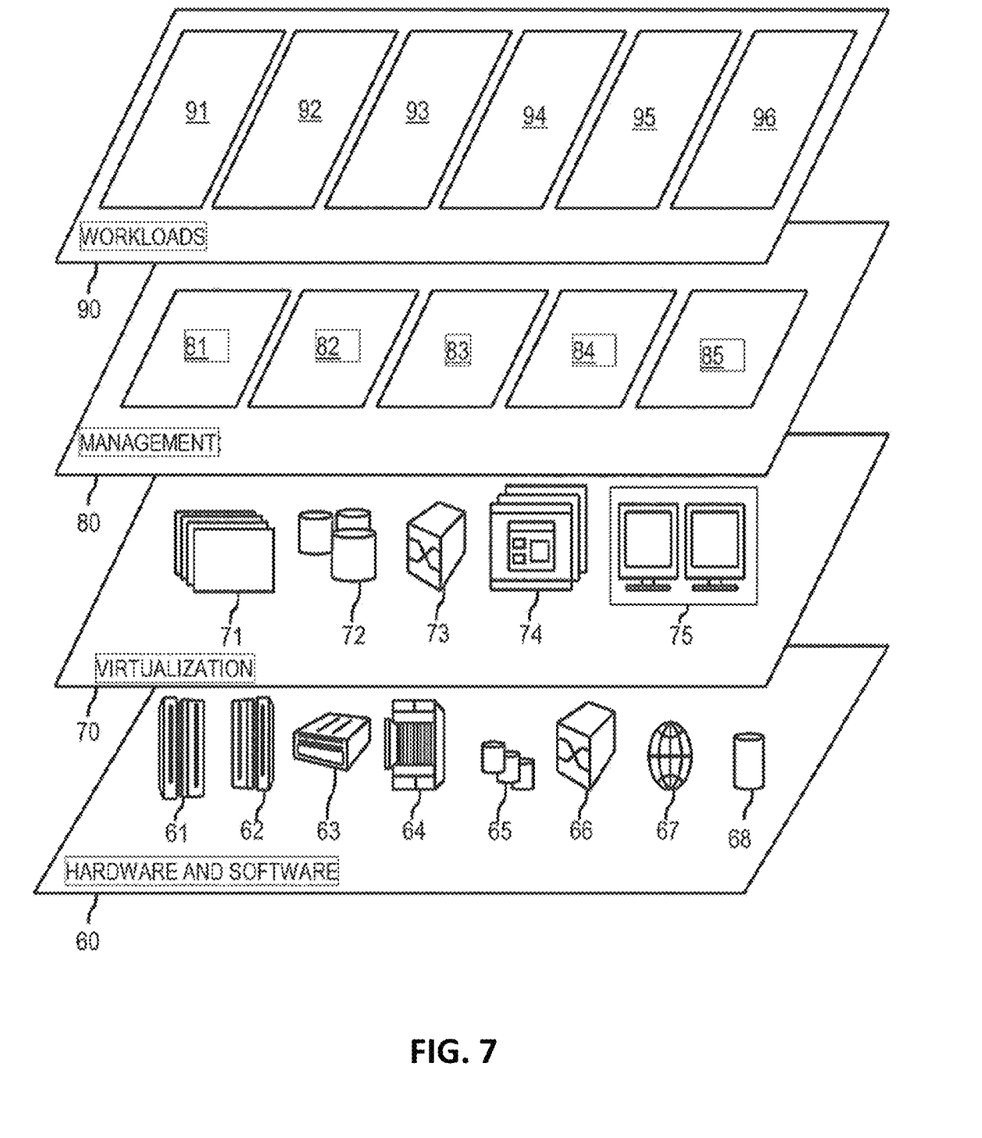
FIG. 7 is a diagram of abstraction model layers of a cloud computing environment in which the present invention may be implemented.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and two-phase commit protocol conformance testing 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A method for performing a two-phase commit conformance test for a cloud based online transaction processing system (OLTP), the method comprising:
   receiving, by a test case manager of the OLTP from a transaction manager of the OLTP, a transaction event including metadata regarding a transaction, wherein the transaction event is configured to initiate the two-phase commit conformance;
   determining, by the test case manager, a state of the transaction;
   identifying, by the test case manager, a test case based on the metadata and the state of the transaction;
   issuing, by a test controller of the test case, state events to the transaction manager, wherein the state events are determined based on the test case;
   obtaining, by a log analyzer of the test case manager, log information from the transaction manager; and
   determining, by the test case manager, compliance by the transaction manager with the two-phase commit conformance test based on the log information,
   wherein the transaction manager is configured to create the transaction events in a random manner that has a frequency that is configurable by a user.

2. The method of claim 1, wherein the test case manager receives the transaction event from the transaction manager via a publish/subscribe server.

3. The method of claim 1, wherein the metadata includes a type of a resource manager, a type of the transaction, a number of participants in the transaction and an identification of the participants.

4. The method of claim 1, wherein the state events are transaction events that are configured to prompt a desired response by the transaction manager.

5. The method of claim 4, wherein determining compliance by the transaction manager with the two-phase commit conformance test includes determining, based on the log information from the transaction manager, whether the transaction manager performed the desired response.

6. The method of claim 1, wherein the state of the transaction is determining by accessing a state machine maintained by a test controller of the test case manager.

7. A computer program product, comprising:
   a storage device; and
   program code stored in the storage device, wherein the program code, when executed by a controller that controls a non-volatile memory array of a data storage system, causes the controller to:
   receive, by a test case manager of the online transaction processing system (OLTP) from a transaction manager of the OLTP, a transaction event including metadata regarding a transaction, wherein the transaction event is configured to initiate the two-phase commit conformance;
   determine, by the test case manager, a state of the transaction;
   identify, by the test case manager, a test case based on the metadata and the state of the transaction;
   issuing, by a test controller of the test case, state events to the transaction manager, wherein the state events are determined based on the test case;
   obtain, by a log analyzer of the test case manager, log information from the transaction manager; and
   determine, by the test case manager, compliance by the transaction manager with the two-phase commit conformance test based on the log information, wherein the transaction manager is configured to create the transaction events in a random manner that has a frequency that is configurable by a user.

8. The computer program product of claim 7, wherein the test case manager receives the transaction event from the transaction manager via a publish/subscribe server.

9. The computer program product of claim 7, wherein the metadata includes a type of a resource manager, a type of the transaction, a number of participants in the transaction and an identification of the participants.

10. The computer program product of claim 7, wherein the state events are transaction events that are configured to prompt a desired response by the transaction manager.

11. The computer program product of claim 10, wherein determining compliance by the transaction manager with the two-phase commit conformance test includes determining, based on the log information from the transaction manager, whether the transaction manager performed the desired response.

12. The computer program product of claim 7, wherein the state of the transaction is determining by accessing a state machine maintained by a test controller of the test case manager.

13. A system for testing a two-phase commit protocol conformance of a cloud based online transaction processing system (OLTP) platform, the system comprising:
a controller configured to be coupled to a non-volatile memory array, wherein the controller is configured to:
receive, by a test case manager of the OLTP from a transaction manager of the OLTP, a transaction event including metadata regarding a transaction, wherein the transaction event is configured to initiate the two-phase commit conformance;
determine, by the test case manager, a state of the transaction;
identify, by the test case manager, a test case based on the metadata and the state of the transaction;
issuing, by a test controller of the test case, state events to the transaction manager, wherein the state events are determined based on the test case;
obtain, by a log analyzer of the test case manager, log information from the transaction manager; and
determine, by the test case manager, compliance by the transaction manager with the two-phase commit conformance test based on the log information,
wherein the transaction manager is configured to create the transaction events in a random manner that has a frequency that is configurable by a user.

14. The system of claim 13, wherein the test case manager receives the transaction event from the transaction manager via a publish/subscribe server.

15. The system of claim 13, wherein the metadata includes a type of a resource manager, a type of the transaction, a number of participants in the transaction and an identification of the participants.

16. The system of claim 13, wherein the state events are transaction events that are configured to prompt a desired response by the transaction manager.

17. The system of claim 16, wherein determining compliance by the transaction manager with the two-phase commit conformance test includes determining, based on the log information from the transaction manager, whether the transaction manager performed the desired response.

18. The method of claim 1, wherein determining compliance by the transaction manager with the two-phase commit conformance test includes determining, based on the log information from the transaction manager, whether the transaction manager performed the desired response.

* * * * *